J. H. COOPER.
STOKING APPARATUS.
APPLICATION FILED JUNE 30, 1915.
1,264,369.
Patented Apr. 30, 1918.
6 SHEETS—SHEET 1.
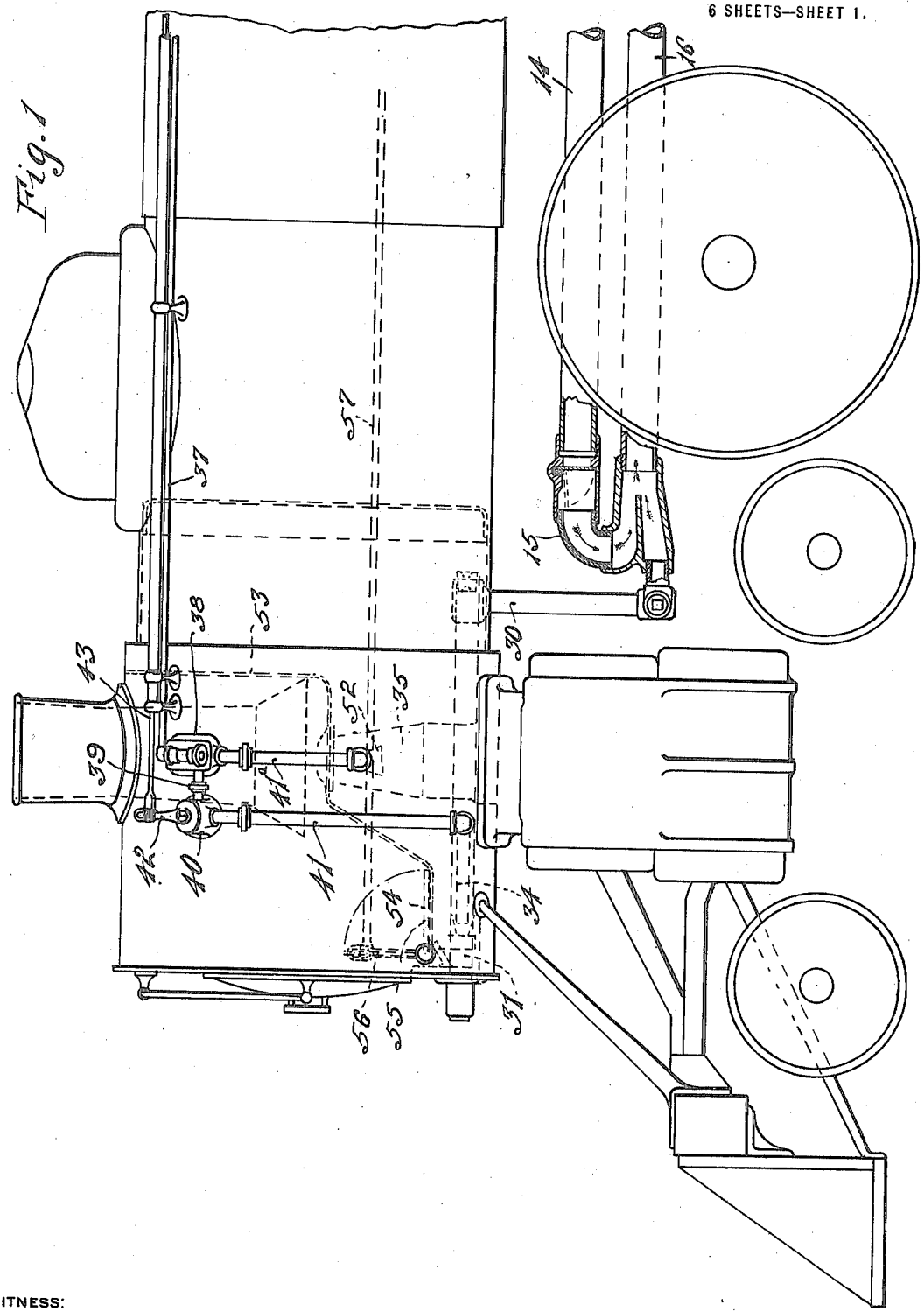
WITNESS:
Julian H. Kendig
INVENTOR.
J. H. Cooper
Synnestvedt Bradley
Lechner Fookes
ATTORNEYS.

J. H. COOPER.
STOKING APPARATUS.
APPLICATION FILED JUNE 30, 1915.
1,264,369.
Patented Apr. 30, 1918.
6 SHEETS—SHEET 2.
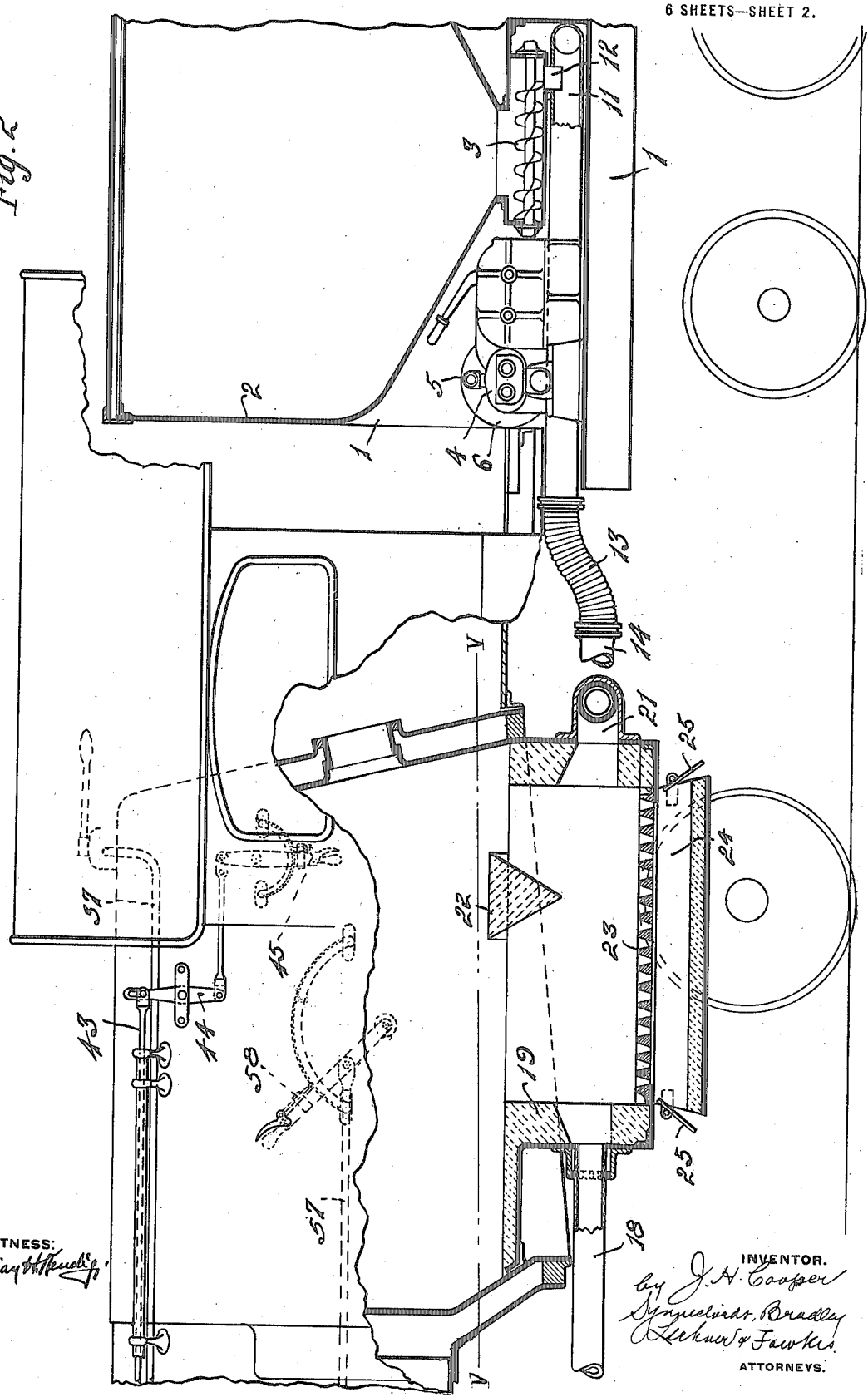

J. H. COOPER.
STOKING APPARATUS.
APPLICATION FILED JUNE 30, 1915.
1,264,369.
Patented Apr. 30, 1918.
6 SHEETS—SHEET 3.
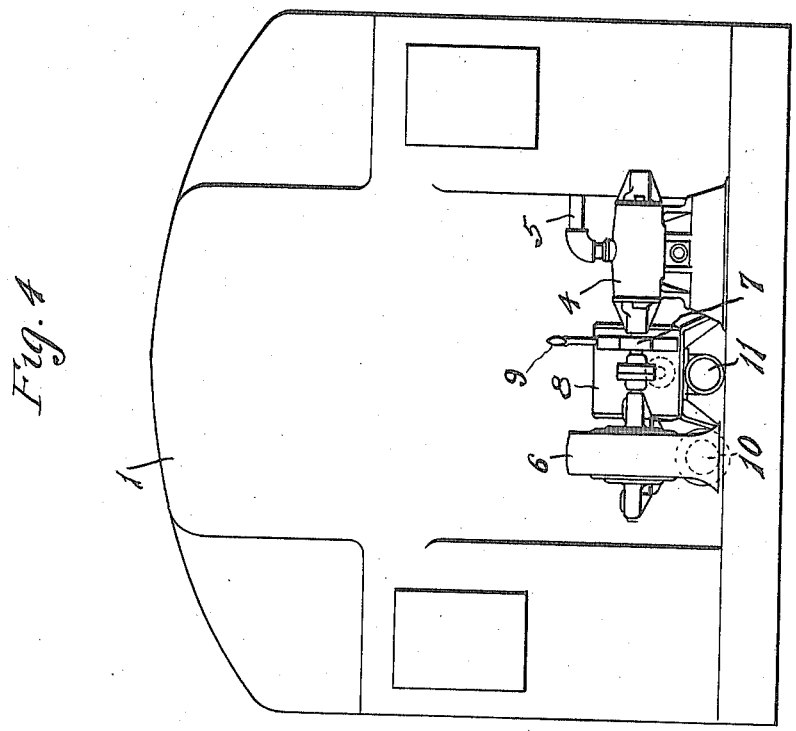
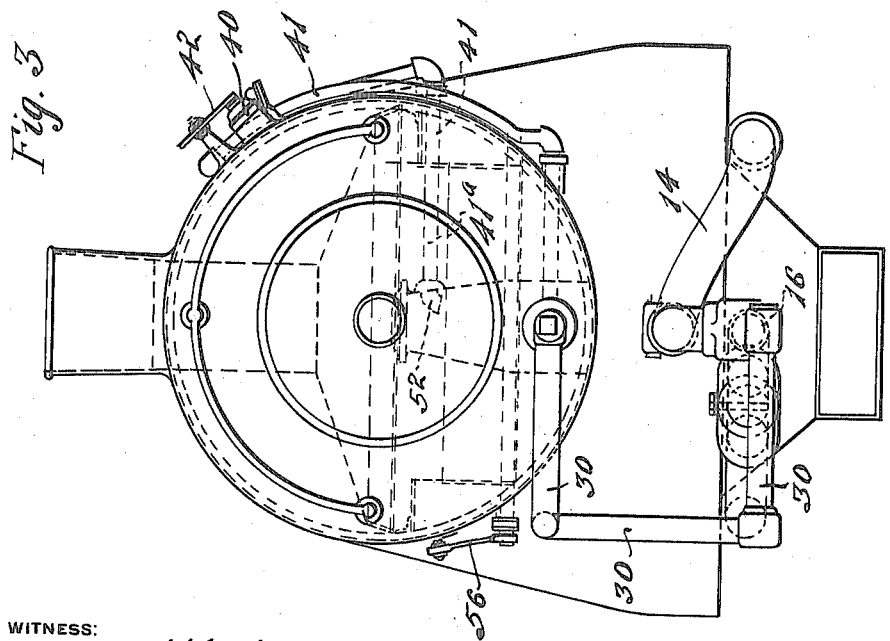
WITNESS:
INVENTOR.
ATTORNEYS.

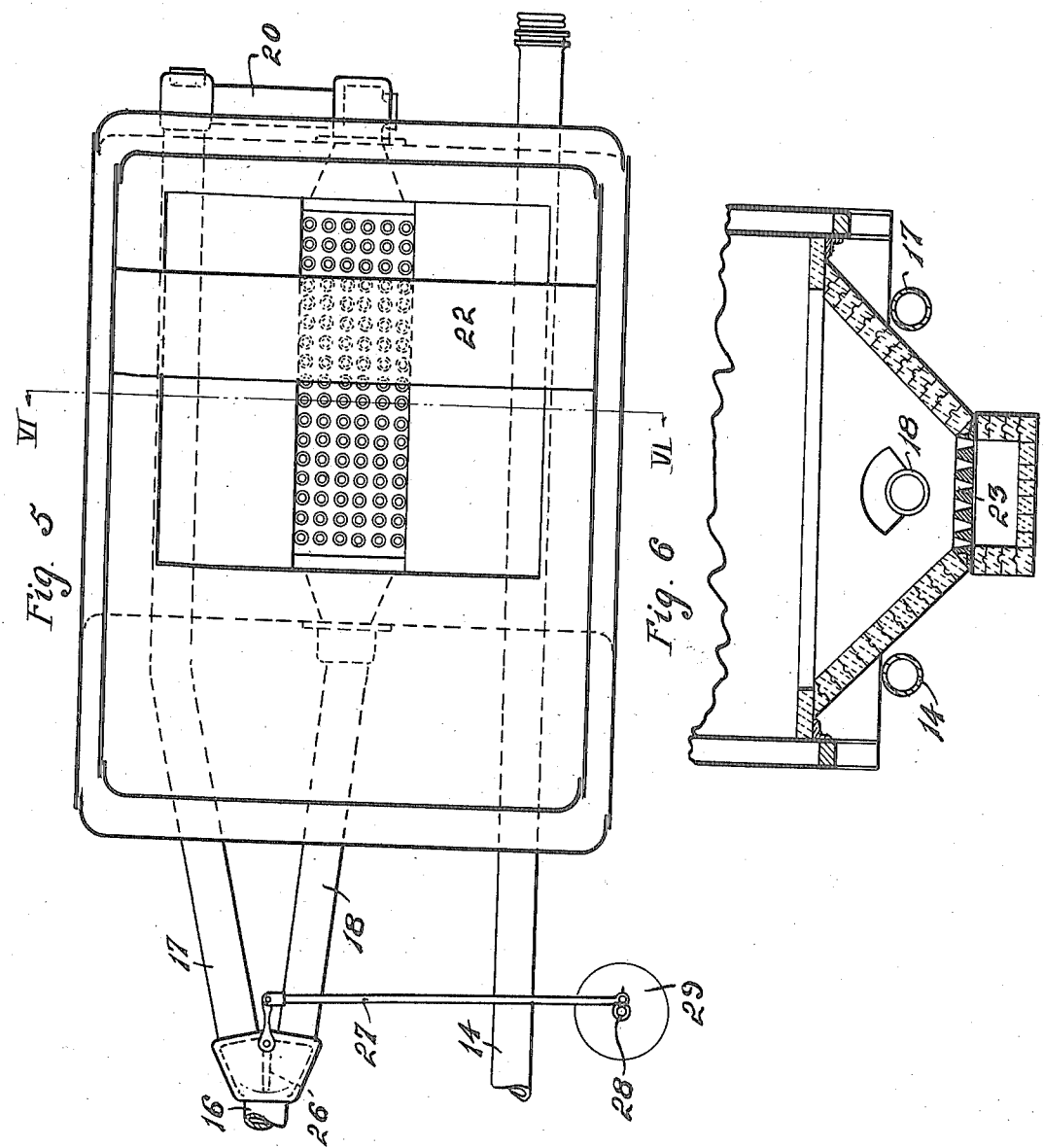

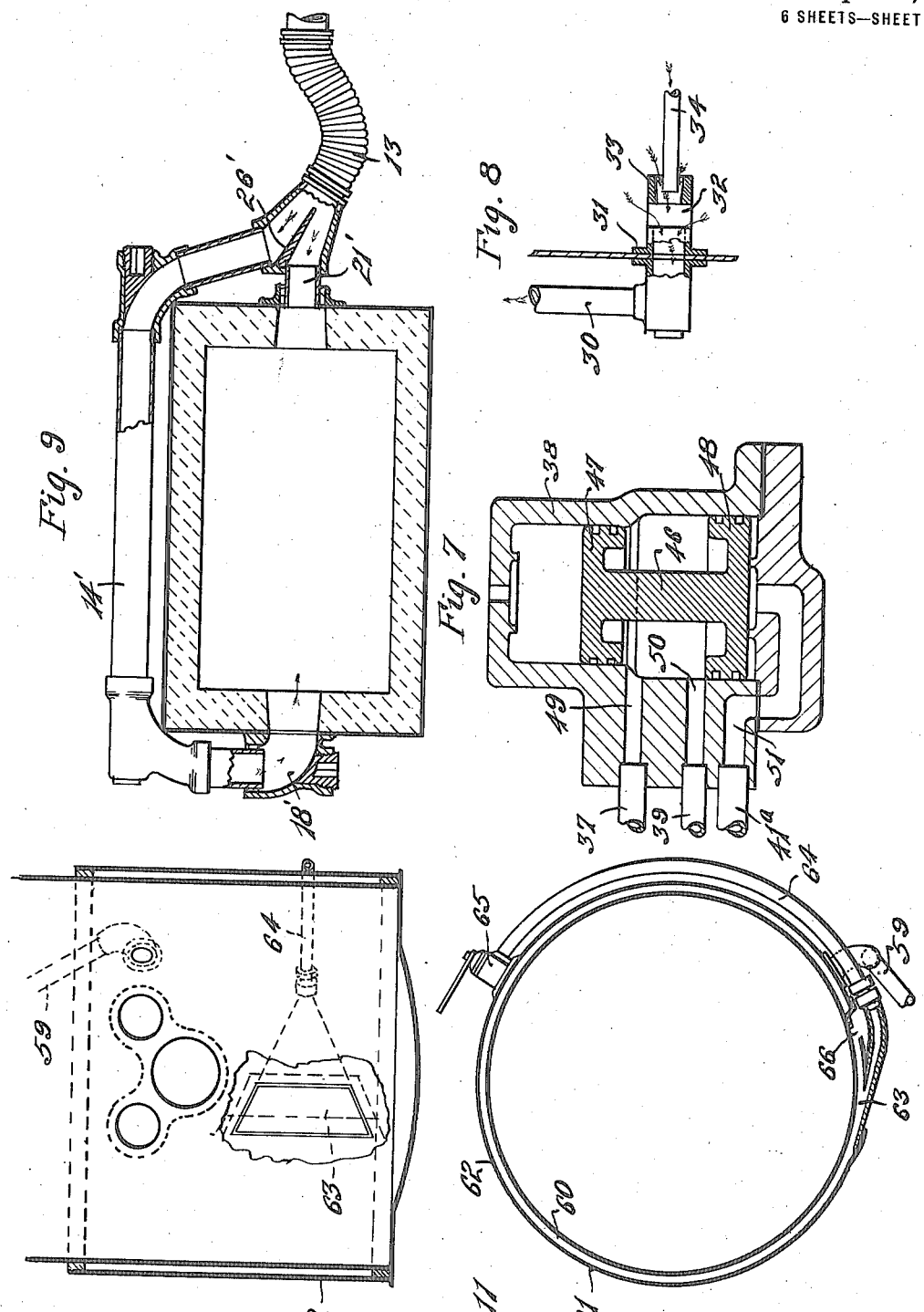

J. H. COOPER.
STOKING APPARATUS.
APPLICATION FILED JUNE 30, 1915.
1,264,369.
Patented Apr. 30, 1918.
6 SHEETS—SHEET 6.
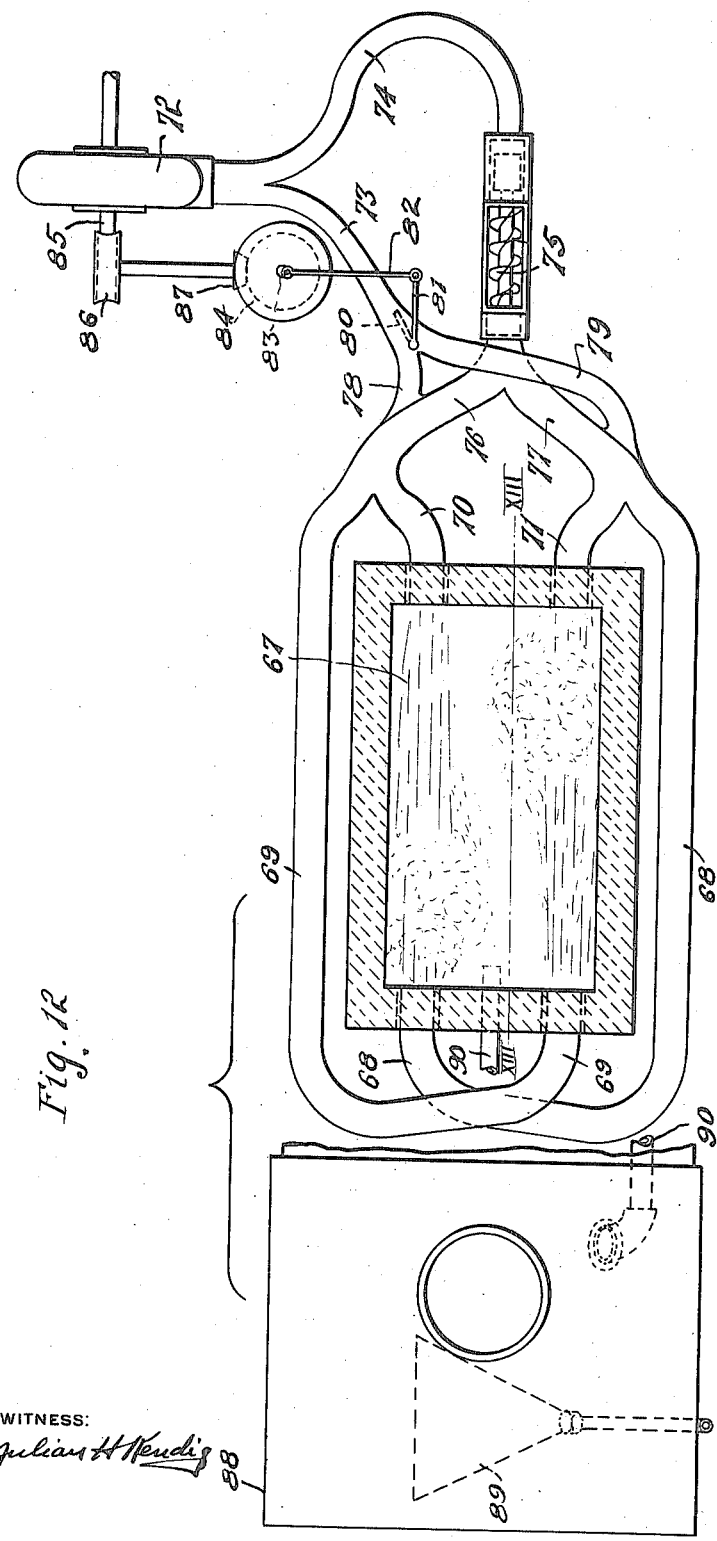
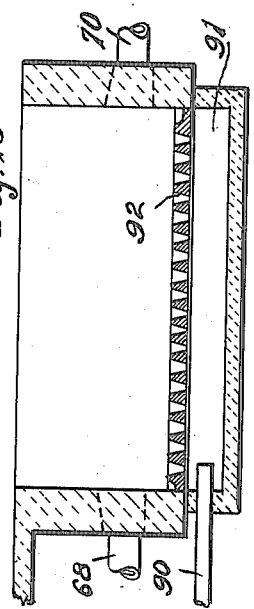
WITNESS:
INVENTOR.
ATTORNEYS.

UNITED STATES PATENT OFFICE.

JOSEPH H. COOPER, OF PITTSBURGH, PENNSYLVANIA.

STOKING APPARATUS.

1,264,369.   Specification of Letters Patent.   Patented Apr. 30, 1918.

Application filed June 30, 1915. Serial No. 37,165.

*To all whom it may concern:*

Be it known that I, JOSEPH H. COOPER, a citizen of the United States, residing at Pittsburgh, in the county of Allegheny and State of Pennsylvania, have invented certain new and useful Improvements in Stoking Apparatus, of which the following is a specification.

The invention relates to stoking apparatus for utilizing powdered fuel and is designed particularly for use in locomotive practice, although capable of use in other relations. The invention has for its primary objects; the provision of improved means for drying the powdered fuel before it is fed into the furnace; the provision of improved means for bringing the powdered fuel and the air supplied with the fuel to a relatively high temperature before admission to the furnace thus promoting the rapidity of combustion and the efficiency of the furnace; the provision of an improved furnace construction whereby the deposit of sulfur and the like in the fire tubes of the boiler is prevented; the provision of means for preventing an undue concentration of heat in any particular part of the furnace tending to burn it out; the provision of improved fuel feeding means; and in general the improvement and simplification of apparatus of the character specified. Certain embodiments of the invention are illustrated in accompanying drawings wherein—

Figure 1 is a side elevation of the front end of a locomotive provided with my improvement, Fig. 2 is a side elevation of the rear portion of the locomotive and the forward portion of the tender, a portion of the structure being shown in cross-section, Fig. 3 is a front end elevation of the locomotive, Fig. 4 is an elevation of the front end of the tender, Fig. 5 is a horizontal section taken on the line V—V of Fig. 2, Fig. 6 is a vertical section on the line VI—VI of Fig. 5, Fig. 7 is a diagrammatic section taken through the automatic valve, Fig. 8 is a horizontal section through the steam jet feed means employed, Fig. 9 is a horizontal section through a furnace provided with a modified form of fuel supply means, Figs. 10 and 11 are horizontal and vertical sections respectively through a smoke-box having a modified arrangement for supplying heated air for drying the fuel, Fig. 12 is a diagrammatic plan view, partially in section, of a modified construction, and Fig. 13 is a section on the line XIII—XIII of Fig. 12.

Referring first to the fuel and air feeding means carried by the tender 1 and illustrated in Figs. 2 and 4; 2 is a container for the powdered fuel having its bottom of hopper form and discharging to the feed screw 3; 4 is a steam turbine supplied with steam from the boiler by means of the pipe 5; 6 is a fan with its shaft in alinement with that of the turbine and directly connected thereto; 7 is a train of gears for operating the feed screw 3 from the turbine 4; 8 is a change speed gear box containing gearing operable from the handle 9 whereby the speed of rotation of the feed screw may be varied to meet requirements. The air supply pipe 10 (Fig. 4) leads to the rear, then turns laterally and extends forwardly beneath the screw 3 as indicated at 11, and the fuel which is fed to the right by the screw 3 (Fig. 2) drops through the opening 12 into the pipe 11 and is carried to the left, a flexible connection 13 being provided between the pipe 11 and the pipe 14.

The pipe 14 extends forwardly to a point adjacent the front end of the locomotive as indicated in Fig. 1, recurving at 15 and extending back to the furnace as indicated at 16. At the bend 15 heated gasses are supplied from the fire-box for drying coal, the apparatus employed for this purpose being later described. The supply pipe 16 is divided at a point to the left of the furnace into two branches 17 and 18, (Fig. 5) the branch 18 extending through the wall 19 of the fire-box while the branch 17 extends to the right hand end of the furnace, then laterally as indicated at 20, and finally leads into the right hand end of the furnace as indicated at 21 in Fig. 2. Lying in the fire-box and interposed between the two feed pipes is the baffle or bridge wall 22 having its side walls inclined toward each other. Beneath the baffle wall is the grate 23 which may be of any approved form, and beneath the grate is the ash pit 24 provided with the doors 25 which may be given any desired degree of opening or which may be closed. One of the purposes of the baffle wall 22 is to secure the precipitation of any sulfur or similar material in the coal which might otherwise be carried into the fire tubes and deposited. The heated baffle wall also promotes combustion and tends to spread the blast from the feed tubes, thus giving a better distribution of the flame throughout the fire-box. The inclination of the faces of the baffle wall may be changed and the vertical position of the wall shifted to meet requirements.

A valve 26 (Fig. 5) is preferably provided at the juncture of the pipes 17 and 18, and by shifting this valve by means of the rod 27 the relative amount of feed through the pipes 17 and 18 may be regulated. This regulation may be made from time to time or if desired a constant movement of the valve 26 back and forth can be secured. This may be accomplished by pivoting the end of the rod 27 to a crank 28 operated from the wheel 29, such wheel being continuously rotated by mechanism not shown. This shifting of the valve 26 performs the function of varying the position of the zone of greatest heat in the fire-box depending upon the relative amount of coal and air supplied through the branches 17 and 18. This is an advantage as a better distribution of heat is secured in the fire-box tending to prevent burning out due to too great concentration of heat.

The arrangement whereby heat is supplied from the smoke-box to dry the coal will be understood by reference to Fig. 1 in connection with Figs. 3, 7, and 8. Stated briefly this apparatus comprises a steam jet feed means whereby the hot gases from the smoke-box are conducted through the pipe 30 into the pipe 16 as illustrated in Fig. 1. The inlet end of the pipe 30 is located at 31 (Figs. 1 and 8) in the smoke-box, the course of the pipe 30 from this point to its discharge end being readily seen by reference to Fig. 3 in connection with Fig. 1. The inlet end 31 of the pipe 30 is provided with a transverse opening 32 and with an end opening 33 into which leads the steam pipe 34, the purpose of the arrangement being to provide a steam jet feed means for carrying the hot air and gases from the smoke-box through the pipe 30 and into the pipe 16, the heat thus provided serving to drive moisture out of the coal, raise its temperature, and thus prepare for more effective combustion.

Steam may be supplied to the pipe 34 either from the exhaust nozzle 35 or directly from the boiler itself, the intention being to utilize the steam from the exhaust when the engine is running, and to shift to the live steam when the engine is not running, automatic means being provided to secure the shift. Live steam is supplied to the jet pipe 34 by means of the pipe 37, valve casing 38, pipe 39, valve casing 40, and pipe 41. The exhaust steam from the nozzle 35 is conducted to the jet pipe 34 via the pipe 41$^a$, the valve casing 38, pipe 39, valve casing 40, and pipe 41, the casing 38 containing the automatic mechanism whereby the shift from exhaust steam to live steam is accomplished. The valve casing 40 contains a rotary valve with a handle 42 whereby the amount of steam passing through the pipe 41 may be controlled. An operating rod 43 extends from the handle 42 to the lever 44 (Fig. 2) and this lever is operated from the hand lever 45 located in the cab.

The valve mechanism located in the casing 38 is illustrated in section in Fig. 7. In order to show all of the pipe connections in one figure the showing is made diagrammatic with the pipe connections all on one side instead of as illustrated in Fig. 1. The casing carries a piston valve 46 having the differential heads 47 and 48, of which 48 is the larger. The casing is also provided with the ports 49, 50 and 51 with which the pipes 37, 39, and 41$^a$ respectively connect. When the parts are in the position illustrated in Fig. 7 live steam from the boiler is being supplied to the jet pipe 34 via the pipe 37, ports 49 and 50, pipe 39, valve casing 40, and pipe 41. When the engine starts steam is supplied through the exhaust nozzle 35, the pressure from the exhaust nozzle acting through the pipe 41$^a$ and port 51 causing the valve 46 to move up thus connecting the ports 51 and 50 and cutting off the connection between the ports 49 and 50. This upward movement of the valve is accomplished by reason of the fact that the steam pressure tending to hold the valve down and acting upon the differential heads 47 and 48 is insufficient to resist the force exerted upon the lower side of the head 48. When the valve is in its upper position steam is supplied from the exhaust nozzle to the jet pipe 34 via pipe 41$^a$, ports 51 and 50, pipe 39, valve casing 40, and pipe 41. When the engine stops the pressure upon the lower side of the head 48 is cut off and the live steam pressure on the differential heads 47 and 48 causes the valve 46 to return to the position of Fig. 7 thereby permitting a supply of live steam to flow to the jet pipe 34. In order to secure a more effective pressure from the exhaust nozzle, the end of the pipe 41$^a$ is provided with a downwardly projecting flaring inlet 52 as indicated in dotted lines in Figs. 1 and 3.

The smoke-box is provided with the usual division wall 53 with an opening 54 at its lower portion, and this opening 54 is governed by a damper 55 having a handle 56, with a connecting rod 57 leading to and operated by the handle 58 in the cab. By opening and closing this damper 55 the degree of heat in the space beneath is regulated, thus influencing the temperature of the gases supplied through the pipe 30.

Fig. 9 illustrates a modification of the arrangement shown in Figs. 1, 2, and 5, the construction being simplified by the omission of the coal heating apparatus illustrated in Fig. 1. In this construction the coal supply pipe 14' has one branch 18' leading into the left hand end of the furnace and another branch 21' leading into the other end of the furnace with a regulating valve 26' for governing the relative amount of coal and air forced into the two ends of the furnace. The furnace construction itself corresponds to that illustrated in Fig. 2.

Figs. 10 and 11 illustrate a modified arrangement for supplying heated gases from the smoke-box to the piping 59 leading to the coal supply pipe and corresponding to the pipe 30 in the construction of Fig. 1. In this arrangement air is heated in a jacket surrounding the smoke-box and supplied to the coal supply pipe instead of taking the heated gases from the interior of the smoke-box as in the construction heretofore described. In this construction of Figs. 10 and 11, 60 is the shell of the fire-box while 61 is a second shell surrounding the shell 60 and spaced away from such shell 60 a relatively short distance thus providing the narrow elongated chamber 62. A tapering nozzle 63 leads into this chamber 62 tangentially and is supplied with steam from the pipe 64, such steam being preferably live steam controlled by means of the valve 65. Air is admitted to the chamber 62 through the opening 66 located to the rear of the nozzle 63. When steam is admitted through the pipe 64 a flow of air is secured through the chamber 62 in a clockwise direction, such air becoming in its passage highly heated and discharging through the pipe 59 to the coal supply pipe. This arrangement has an advantage over the construction of Fig. 1 in that the air supply to the coal contains a larger quantity of oxygen than is the case where the gases are supplied from the interior of the smoke-box, so that combustion is promoted to a greater degree than with the other type of construction. In some cases it may be desirable to conduct the air from the pipe 59 to the space beneath the grates of the furnace, thus giving an up-draft of hot air through the furnace, instead of supplying such heated air to the coal supply pipe.

Figs. 12 and 13 illustrate still another modified form of construction in which the furnace 67 is provided at each end with the two supply passages 68 and 69, and 70 and 71 instead of with only a single supply passage as in the construction of Fig. 2. The fan 72 is provided with two pipes 73 and 74, the pipe 74 leading the air beneath the screw 75 as in the construction of Fig. 2, and then dividing as indicated at 76 and 77. The other pipe 73 divides as indicated at 78 and 79 and is provided with a controlling valve 80. This controlling valve 80 is continuously shifted back and forth by means of the handle 81 and connecting rod 82, the latter being connected at its upper end to the crank 83. The crank 83 is carried by the bevel gear 84 driven from the shaft 85 by means of the worm gear 86 and pinion 87. This arrangement provides for the varying of the amount of air supplied to the two ends of the furnace without modifying the flow of air passing through the pipe 74 and past the feed screw 75. It will be seen that by this arrangement the flow of air through the pipes 69 and 70 may be increased as that through the pipes 68 and 71 is decreased and vice versa, thus shifting the zones of greatest heat on the two sides of the furnace back and forth.

In this construction of Figs. 12 and 13 an annular chamber 88 is provided around the front end of the smoke-box as in the construction of Figs. 10 and 11, the nozzle 89 corresponding to the nozzle 63 of Fig. 10, being employed and the heated air being conducted from the annular chamber by means of the pipe 90. This pipe 90 leads to a closed chamber 91 beneath the grate 92 of the furnace as indicated in Fig. 13 so that a supply of hot air is directed upwardly through the grate tending to promote combustion and reduce the smoke when the locomotive is standing, a result which is also secured to a greater or less degree in the constructions of Figs. 1 and 10 heretofore described.

What I claim is:

1. In combination with a furnace, supply pipes leading into opposite sides of the furnace, means for supplying powdered fuel to the pipes, means for applying air pressure to the pipes to feed the fuel therethrough and power driven shaft means for periodically increasing the feed through one pipe and simultaneously decreasing the feed through the other pipe.

2. In combination with a steam generator having a fire-box and a smoke-box, provided with an exhaust nozzle, a container for powdered fuel, a pipe for conducting the powdered fuel to the fire-box, means for supplying air under pressure to feed the fuel through the said pipe, and steam jet feed means operated from the exhaust nozzle for supplying heated gas under pressure from the smoke-box to the said pipe.

3. In combination with a steam generator having a fire-box and a smoke-box, provided with an exhaust nozzle, a container for powdered fuel, a pipe for conducting the powdered fuel to the fire-box, means for supplying air under pressure to feed the fuel through the said pipe, steam jet feed means for supplying heated gas under pressure from the smoke-box to the said pipe, a connection from the exhaust nozzle for supplying the jet feed means when the exhaust nozzle is operating, and other connections for supplying live steam to the jet feed means when the exhaust nozzle is not operating.

4. In combination with a steam generator having a fire-box and a smoke-box, provided with an exhaust nozzle, a container for powdered fuel, a pipe for conducting the powdered fuel to the fire-box, means for supplying air under pressure to feed the fuel through the said pipe, steam jet feed means for supplying heated gas under pressure from the smoke-box to the said pipe, a connection from the exhaust nozzle for supplying the jet feed means when the exhaust nozzle is operating, other connections for supplying live steam to the jet feed means when the exhaust nozzle is not operating, and automatic means for securing the shift back and forth from the one steam supply means to the other.

J. H. COOPER.